Patented Dec. 9, 1930

1,784,583

UNITED STATES PATENT OFFICE

HENRY DREYFUS, OF LONDON, ENGLAND

PROCESS OF MAKING ACETIC ACID

No Drawing. Application filed October 22, 1926, Serial No. 143,516, and in Great Britain November 7, 1925.

This invention relates to the manufacture of acetic acid from methyl alcohol.

In my previous British application No. 15,395/25 and in my U. S. application S. No. 112,165 filed 27th May 1926, I have described how acetic acid may be produced by heating methyl alcohol and carbon monoxide together under pressure, in presence of catalysts.

According to the present invention I have found that acetic acid may be produced by treating methyl alcohol under substantially normal or atmospheric pressure with carbon monoxide (in presence or absence of hydrogen) in presence of certain catalysts hereinafter specified.

The catalysts which I employ for the purpose of the present invention are substances that are, or are capable of forming acetates which split off acetic acid at temperatures under about 400–450° C. and preferably between about 200° and 350° C. Such catalysts may be employed alone or in admixture with other catalysts. By employing such catalysts or catalyst mixtures, the methyl alcohol and carbon monoxide (or mixtures of carbon monoxide and hydrogen) can be combined and acetic acid split off or evolved continuously with regeneration of the catalysts.

Some examples of catalysts which may be employed are the oxides, acetates, methylates and other compounds of heavy metals, that is to say, metals other than the alkali or alkaline earth metals, for example copper oxide, tin oxide, lead oxide, copper acetate, zinc oxide, zinc acetate, zinc methylate, aluminum methylate, tin methylate or the like, finely divided heavy metals, for instance, finely divided zinc, aluminum, copper, or mixtures of any two or more of any of the foregoing with each other, or mixtures of any of them with more basic materials such as potassium acetate or sodium acetate.

Further, even mixtures of or containing one or more of the foregoing,—for instance the said metal methylates, with one or more alkali methylates such as potassium methylate or sodium methylate, may be employed.

Regarding the finely divided metals above referred to, these may of course be produced in any known or suitable way; preferably however when finely divided metals are employed they are produced by reducing organic salts of the metals with hydrogen; thus for example very useful finely divided copper or aluminum may be produced by reducing copper formate or aluminum formate with hydrogen.

The reaction of the present invention may be executed in any suitable way; for example I may pass methyl alcohol vapour and carbon monoxide in admixture or not with hydrogen over or through the catalyst or catalysts under substantially normal or atmospheric pressure, the mixtures of methyl alcohol vapour and carbon monoxide (or methyl alcohol vapour, carbon monoxide and hydrogen) being either simply passed over or through the catalyst or catalyst mixtures or circulated in a closed system over or through the catalyst or catalysts.

The reaction may be performed at temperatures of about 200 to 400 to 500° C. and preferably at temperatures between about 200 to 350° C.

The process is illustrated by the following example, which is only typical of the methods of procedure that may be adopted, and may be varied within wide limits without departing from the invention as herein described.

Example

A mixture of methyl alcohol vapour and carbon monoxide conveniently prepared by bubbling carbon monoxide through methyl alcohol at temperatures of 45°–55° C., is passed at atmospheric pressure through a chamber filled with granules of a suitable metallic oxide, for example, tin oxide, zinc oxide, aluminium oxide, or chromium oxide and maintained at temperatures of about 300° to 350° C. The acetic acid is condensed and redistilled if necessary. The uncondensed vapours are recirculated through the system for further reaction.

It is to be understood that the acetic acid may be obtained either in the free state or as the methyl ester which is formed by combination of the acetic acid with the methyl alcohol, especially when excess of methyl alcohol is used.

What I claim and desire to secure by Letters Patent is:—

1. Process of making acetic acid comprising heating methyl alcohol and carbon monoxide under substantially atmospheric pressure and at a temperature under 400° C. in the presence of a catalyst capable of causing methyl alcohol and carbon monoxide to form acetic acid.

2. A process for the manufacture of acetic acid, which comprises heating methyl alcohol together with carbon monoxide under substantially atmospheric pressure in the presence of a catalyst comprising a metal capable of forming an acetate which decomposes with the formation of acetic acid at a temperature under 450° C.

3. A process for the manufacture of acetic acid, which comprises heating methyl alcohol together with carbon monoxide under substantially atmospheric pressure at a temperature between 100° to 450° C., in the presence of a catalyst comprising a metal capable of forming an acetate which decomposes with the formation of acetic acid at a temperature under 450° C.

4. A process for the manufacture of acetic acid, which comprises heating methyl alcohol together with carbon monoxide under substantially atmospheric pressure at a temperature between 200° and 300° C. in the presence of a catalyst comprising a metal capable of forming an acetate which decomposes with the formation of acetic acid at a temperature under 450° C.

5. A process for the manufacture of acetic acid, which comprises heating methyl alcohol together with carbon monoxide under substantially atmospheric pressure at a temperature between 200° and 300° C. in the presence of a catalyst comprising a metal capable of forming an acetate which decomposes with the formation of acetic acid at a temperature between 200° and 300° C.

6. A process for the manufacture of acetic acid, which comprises heating methyl alcohol together with carbon monoxide under substantially atmospheric pressure in the the presence of a catalyst comprising a metal acetate which decomposes with the formation of acetic acid at a temperature under 450° C.

7. A process for the manufacture of acetic acid, which comprises heating methyl alcohol together with carbon monoxide under substantially atmospheric pressure at a temperature between 100° to 450° C., in the presence of a catalyst comprising a metal acetate which decomposes with the formation of acetic acid at a temperature under 450° C.

8. A process for the manufacture of acetic acid which comprises heating methyl alcohol together with carbon monoxide under substantially atmospheric pressure at a temperature between 200° and 300° C. in the presence of a catalyst comprising a metal acetate which decomposes with the formation of acetic acid at a temperature under 450° C.

9. A process for the manufacture of acetic acid, which comprises heating methyl alcohol together with carbon monoxide under substantially atmospheric pressure at a temperature between 200° and 300° C. in the presence of a catalyst comprising a metal acetate which decomposes with the formation of acetic acid at a temperature between 200° and 300° C.

In testimony whereof I have hereunto subscribed my name.

HENRY DREYFUS.